(12) United States Patent
Mahnkopf

(10) Patent No.: US 11,958,461 B2
(45) Date of Patent: Apr. 16, 2024

(54) DETECTION METHOD AND SENSOR DEVICE FOR AN ELECTROMECHANICAL BRAKE BOOSTER OF AN ON-BOARD HYDRAULIC BRAKING SYSTEM

(71) Applicant: Robert Bosch GmbH, Stuttgart (DE)

(72) Inventor: Dirk Mahnkopf, Eglosheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 317 days.

(21) Appl. No.: 17/621,849

(22) PCT Filed: Jun. 24, 2020

(86) PCT No.: PCT/EP2020/067680
§ 371 (c)(1),
(2) Date: Dec. 22, 2021

(87) PCT Pub. No.: WO2021/004790
PCT Pub. Date: Jan. 14, 2021

(65) Prior Publication Data
US 2022/0363228 A1  Nov. 17, 2022

(30) Foreign Application Priority Data
Jul. 11, 2019 (DE) ...................... 10 2019 210 269.7

(51) Int. Cl.
*B60T 8/172* (2006.01)
*B60T 13/74* (2006.01)

(52) U.S. Cl.
CPC ............. *B60T 8/172* (2013.01); *B60T 13/745* (2013.01)

(58) Field of Classification Search
CPC ................................ B60T 8/172; B60T 13/745
(Continued)

(56) References Cited

U.S. PATENT DOCUMENTS 8,240,780 B1 * 8/2012 Klimes ................. B60T 13/147
303/114.1
11,718,181 B2 * 8/2023 Yamamoto ................ B60T 1/10
701/70
(Continued)

FOREIGN PATENT DOCUMENTS

CN  102211573 A  10/2011
CN  104309597 A  1/2015
(Continued)

OTHER PUBLICATIONS

International Search Report for PCT/EP2020/067680, dated Nov. 2, 2020.

*Primary Examiner* — Erick R Solis
(74) *Attorney, Agent, or Firm* — NORTON ROSE FULBRIGHT US LLP; Gerard A. Messina

(57) ABSTRACT

A detection method for an electromechanical brake booster. The method includes: ascertaining, while both a driver braking force is transferred to an input element and a motor force is transferred to a support element so that a coupling element of the electromechanical brake booster which is provided downstream from the input element and the support element is also displaced at least using the motor force, whether an open intermediate gap, when the input element is present in its starting position, is closed when the coupling element is present in its starting position, and establishing an actual variable with respect to a coupling element path of the coupling element out of its coupling element starting position and/or a coupling element velocity of the coupling element in the case of an open intermediate gap using a first formula, and in the case of a closed intermediate gap using a second formula.

10 Claims, 3 Drawing Sheets

(58) Field of Classification Search
USPC .................................................. 701/70, 78
See application file for complete search history.

(56) References Cited

U.S. PATENT DOCUMENTS

| | | | |
|---|---|---|---|
| 2012/0062024 A1 | 3/2012 | Mahnkopf | |
| 2013/0186221 A1* | 7/2013 | Weiberle | F16H 21/44 324/207.2 |
| 2013/0199364 A1* | 8/2013 | Weiberle | B60T 8/4077 92/261 |
| 2015/0028664 A1* | 1/2015 | Choi | B60T 13/745 303/3 |
| 2019/0001940 A1* | 1/2019 | Roberts | B60T 13/745 |
| 2020/0262407 A1* | 8/2020 | Yamamoto | F16D 61/00 |
| 2021/0078558 A1* | 3/2021 | Zipprich | B60T 13/745 |
| 2023/0044940 A1* | 2/2023 | Kim | B60T 17/22 |
| 2023/0066581 A1* | 3/2023 | Shin | B60T 13/162 |
| 2023/0219551 A1* | 7/2023 | Jung | B60T 13/662 701/70 |

FOREIGN PATENT DOCUMENTS

| | | |
|---|---|---|
| CN | 104340197 A | 2/2015 |
| CN | 204750141 U | 11/2015 |
| DE | 102009045415 A1 | 4/2011 |
| DE | 102010038555 A1 | 2/2012 |
| DE | 102010043203 A1 | 5/2012 |
| DE | 202010017605 U1 | 10/2012 |
| EP | 2536604 A1 | 12/2012 |
| JP | 2013506598 A | 2/2013 |
| JP | 2019006267 A | 1/2019 |
| WO | 2011098175 A1 | 8/2011 |
| WO | 2015185241 A1 | 12/2015 |
| WO | 2019065332 A1 | 4/2019 |

* cited by examiner

DETECTION METHOD AND SENSOR DEVICE FOR AN ELECTROMECHANICAL BRAKE BOOSTER OF AN ON-BOARD HYDRAULIC BRAKING SYSTEM

FIELD

The present invention relates to a detection method for an electromechanical brake booster of an on-board hydraulic braking system. The present invention furthermore relates to a sensor device for an electromechanical brake booster of an on-board hydraulic braking system, to an electromechanical brake booster for an on-board hydraulic braking system, and to a hydraulic braking system for a vehicle.

BACKGROUND INFORMATION

It is conventional in the related art to use not only a driver braking force exerted on a brake actuating element, such as for example a brake pedal, but also a motor force/support force of an electric motor to increase a braking pressure in at least one wheel brake cylinder of a hydraulic braking system. For example, German Patent Application No. DE 20 2010 017 605 U1 describes an (electromechanical) brake booster, with the aid of which both a driver braking force exerted on the particular brake actuating element and a motor force/support force of the electric motor of the brake booster are couplable into a master brake cylinder of a hydraulic braking system.

SUMMARY

The present invention provides a detection method for an electromechanical brake booster of an on-board hydraulic braking system, a sensor device for an electromechanical brake booster of an on-board hydraulic braking system, an electromechanical brake booster for an on-board hydraulic braking system, and a hydraulic braking system for a vehicle.

The present invention provides advantageous options for relatively precisely determining a coupling element path of the coupling element displaced out of its coupling element starting position and/or a coupling element velocity of the coupling element, with the aid of which both the driver braking force and the motor force of the electric motor are couplable into the particular on-board hydraulic braking system.

The "input element," the "support element" and the "coupling element" do not have to be understood to be single-piece/compact parts. The coupling element may, for example, include a reaction disk and an output rod of the electromechanical brake booster. Conventionally, an output rod path of the output rod of the electromechanical brake booster displaced out of its output rod starting position may be determined using only a measurement of a motor position of the electric motor of the electromechanical brake booster and a differential path between an input element path of the input element displaced out of its input element starting position and a support element path of the support element displaced out of its support element starting position. In contrast to this conventional option of determining the output rod path of the output rod displaced out of its output rod starting position, techniques of the present invention are free of a systematic error. This contributes to the more precise and more error-free determination of the respective coupling element path out of its coupling element starting position and/or of the respective coupling element velocity of the coupling elements compared to the related art.

In one advantageous specific embodiment of the detection method of the present invention, an instantaneous intermediate gap width g of the intermediate gap is established according to: $g = g_0 - \Delta x - F_{motor} * \eta * (1+\eta)/c$, where $g_0$ is a starting intermediate gap width of the gap which is open when the input element is present in its input element starting position and the coupling element is present in its coupling element starting position, $\Delta x$ is a differential path between an input element path of the input element out of its input element starting position and a support element path of the support element out of its support element starting position, $F_{motor}$ is the motor force, $\eta$ is a quotient of a first lever arm of the motor force $F_{motor}$ at the coupling element divided by a second lever arm of the driver braking force $F_{driver}$ at the coupling element, and c is a coefficient of elasticity of the coupling element, and, if the instantaneous intermediate gap width g is greater than zero, it being determined that the intermediate gap is open and, if the instantaneous intermediate gap width is smaller than or equal to zero, it being determined that the intermediate gap is closed. As an alternative, the instantaneous intermediate gap width g of the intermediate gap may also be established according to: $g = g_0 - \Delta x - c_{pV} * x_{out} * \eta * (1+\eta)/c$, where $g_0$ is a starting intermediate gap width of the gap which is open when the input element is present in its input element starting position and the coupling element is present in its coupling element starting position, $\Delta x$ is a differential path between an input element path of the input element out of its input element starting position and a support element path $x_{motor}$ of the support element out of its support element starting position, $c_{pV}$ is a coefficient of elasticity of the hydraulic braking system, $x_{out}$ is the coupling element path of the coupling element out of its coupling element starting position, $\eta$ is a quotient of a first lever arm of the motor force $F_{motor}$ at the coupling element divided by a second lever arm of the driver braking force $F_{driver}$ at the coupling element, and c is a coefficient of elasticity of the coupling element, and, if the instantaneous intermediate gap width g is greater than zero, it being determined that the intermediate gap is open and, if the instantaneous intermediate gap width is smaller than or equal to zero, it being determined that the intermediate gap is closed. The two formulas described here allow a reliable recognition of whether the intermediate gap is open or closed.

In a further advantageous specific embodiment of the detection method of the present invention, in the case of an open intermediate gap, a change $\delta x_{out}$ of the coupling element path $x_{out}$ of the coupling element is established according to $\partial x_{out} = \partial x_{motor} - \partial F_{motor} * \eta^2 / c$, as the first formula, as the at least one actual variable, $\delta x_{motor}$ being a change in support element path $x_{motor}$ of the support element, $\delta F_{motor}$ being a change in motor force $F_{motor}$, $\eta$ being a quotient of a first lever arm of motor force $F_{motor}$ at the coupling element divided by a second lever arm of driver braking force $F_{driver}$ at the coupling element, and c being a coefficient of elasticity of the coupling element. As an alternative, in the case of an open intermediate gap, a change $\delta x_{out}$ of coupling element path $x_{out}$ of the coupling element may be established according to $$\partial x_{out} = \partial x_{motor} * \frac{1}{1 + \frac{\eta^2 * c_{pV}}{c}},$$

as the first formula, as the at least one actual variable, $\delta x_{motor}$ being a change in support element path $x_{motor}$ of the support element, $\eta$ being a quotient of a first lever arm of motor force $F_{motor}$ at the coupling element divided by a second lever arm of driver braking force $F_{driver}$ at the coupling element, $c_{pV}$ being a coefficient of elasticity of the hydraulic braking system, and c being a coefficient of elasticity of the coupling element. The two formulas described here enable a comparatively precise establishment of the change in the support element path of the support element, or in the coupling element path of the coupling element.

In the case of a closed intermediate gap, coupling element velocity $v_{out}$ of the coupling element is established according to $$v_{out} = \frac{v_{motor} + \eta * v_{driver}}{1 + \eta},$$

as the second formula, as the at least one actual variable, $v_{motor}$ being a support element velocity of the support element, $v_{driver}$ being an input element velocity of the input element, and $\eta$ being a quotient of a first lever arm of motor force $F_{motor}$ at the coupling element divided by a second lever arm of driver braking force $F_{driver}$ at the coupling element. In this way, the coupling element velocity of the coupling element may be determined relatively precisely.

An accordingly designed sensor device for an electromechanical brake booster of an on-board hydraulic braking system also ensures the above-described advantages.

An electromechanical brake booster for an on-board hydraulic braking system including such a sensor device also effectuates the above-described advantages. The coupling element may, for example, include a reaction disk.

Furthermore, a hydraulic braking system for a vehicle also creates the above-described advantages, if the braking system is designed with such a sensor device, the electromechanical brake booster cooperating with the sensor device, a master brake cylinder which is provided upstream from the electromechanical brake booster, and at least one brake circuit which is hydraulically connected to the master brake cylinder and in each case includes at least one wheel brake cylinder.

BRIEF DESCRIPTION OF THE DRAWINGS

Further features and advantages of the present invention are described hereafter based on the figures.

DETAILED DESCRIPTION OF EXAMPLE EMBODIMENTS

Figure 1A:
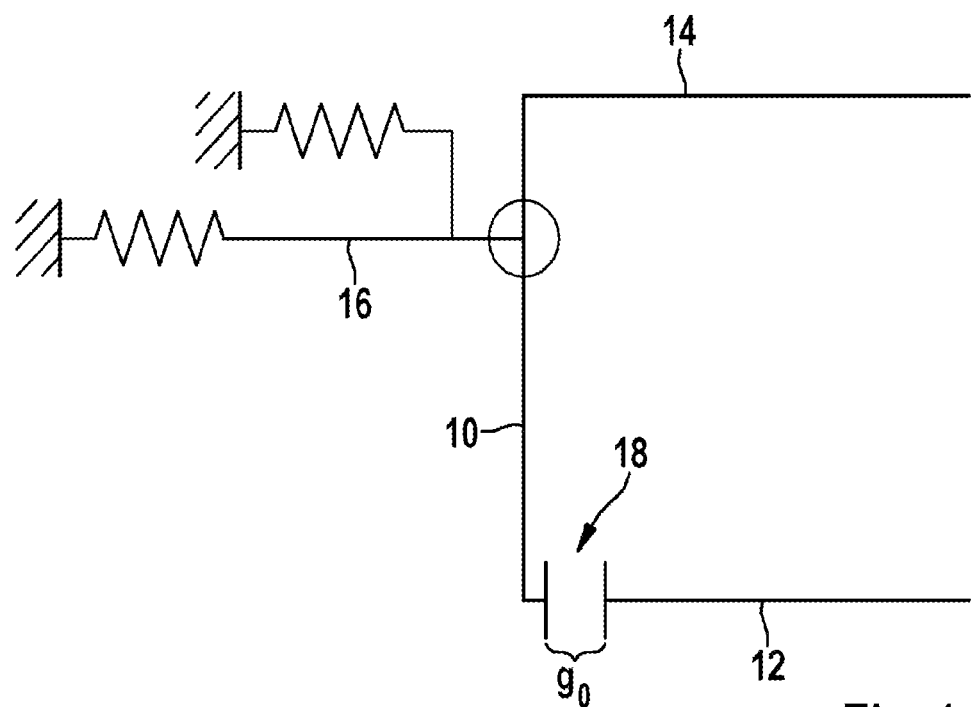
FIGS. 1A and 1B show a schematic representation and a rheological chart of a first brake booster type for explaining one specific embodiment of the detection method of the present invention.
Figure 1B:
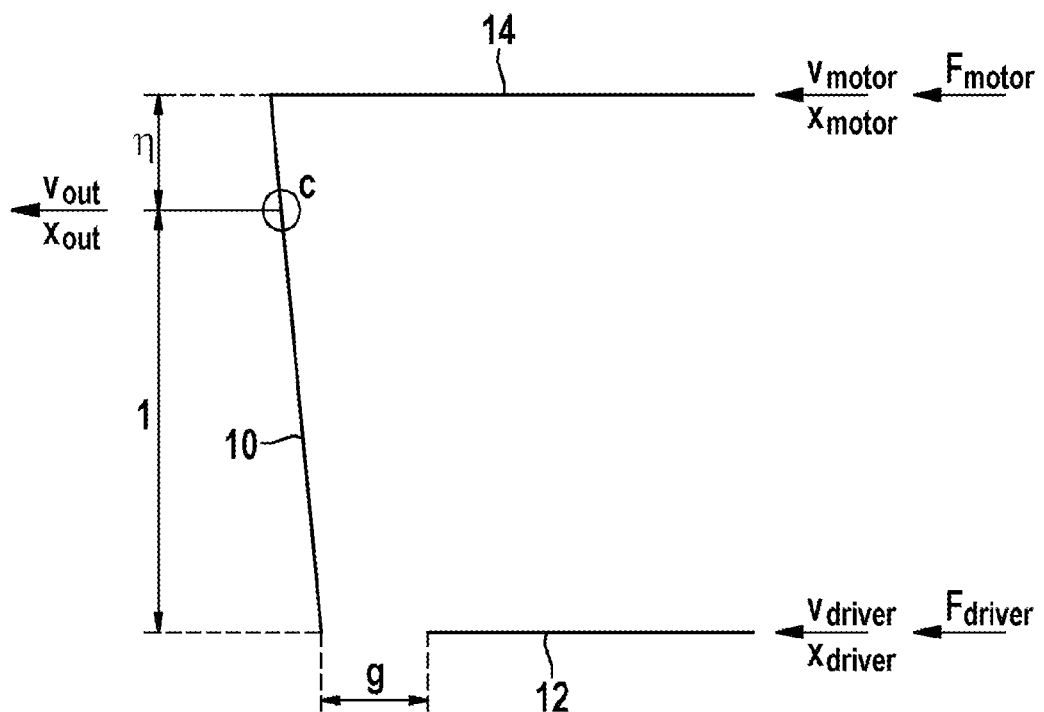

FIGS. 1A and 1B show a schematic representation and a rheological chart of a first brake booster type for explaining one specific embodiment of the detection method.

The brake booster type shown schematically in FIGS. 1A and 1B may be defined as a "traditional" electromechanical brake booster including a (hydraulic) reaction disk 10. Reaction disk 10 is part of a coupling element of the electromechanical brake booster. The electromechanical brake booster shown schematically with the aid of FIGS. 1A and 1B, in addition to its reaction disk 10, also includes at least one input element 12, a support element 14, and an output rod 16, output rod 16 being another part of its coupling element.

A brake actuating element (not shown) is connectable/connected to input element 12 of the electromechanical brake booster in such a way that a driver braking force $F_{driver}$ exerted on the brake actuating element is transferable/transferred to the connected input element 12. Accordingly, an electric motor (not sketched) is connectable/connected to support element 14 in such a way that a motor force $F_{motor}$ of the electric motor is transferable/transferred to the connected support element 14. If driver braking force $F_{driver}$ and the motor force of the electric motor $F_{motor}$ are each equal to zero, input element 12 is present in its input element starting position, and support element 14 is present in its support element starting position.

The coupling element is provided downstream from input element 12 and support element 14. If driver braking force $F_{driver}$ and the motor force of electric motor $F_{motor}$ are equal to zero, the coupling element is present in its coupling element starting position, support element 14 present in its support element starting position contacting the coupling element (specifically its reaction disk 10) present in its coupling element starting position, while an open intermediate gap 18 is present between input element 12 present in its input element starting position and the coupling element (specifically its reaction disk 10) present in its coupling element starting position. In this way, a transfer of motor force $F_{motor}$ from support element 14 present in its support element starting position to the coupling element present in its coupling element starting position is possible, while a transfer of driver braking force $F_{driver}$ to the coupling element with the aid of open intermediate gap 18 is at least suppressed when input element 12 is present in its input element starting position.

During an execution of the detection method described here, while both driver braking force $F_{driver}$ is being transferred to input element 12 and motor force $F_{motor}$ is being transferred to support element 14 in such a way that input element 12 is displaced out of an input element starting position with the aid of driver braking force $F_{driver}$, and support element 14 is displaced out of its support element starting position with the aid of motor force $F_{motor}$, and the coupling element is also displaced out of its coupling element starting position at least with the aid of motor force $F_{motor}$, it is ascertained whether intermediate gap 18, which is at least open when input element 12 is present in its input element starting position and coupling element 14 is present in its coupling element starting position, is closed in such a way that the coupling element is also displaced with the aid of motor force $F_{motor}$ and with the aid of driver braking force $F_{driver}$.

The method step described here is, for example, carried out by establishing/ascertaining an instantaneous intermediate gap width g of intermediate gap 18:

As is apparent based on the rheological chart of FIG. 1B, equation (Eq. 1) also applies to reaction disk 10 "as a force balance" when driver braking force $F_{driver}$ and motor force $F_{motor}$ are acting jointly:

$$-c*d_s = F_{driver} - F_{motor}*\eta, \tag{Eq. 1}$$

where c is a coefficient of elasticity of the coupling element (i.e., a coefficient of elasticity of reaction disk 10 in the example of FIGS. 1A and 1B), η is a quotient of a first lever arm of motor force $F_{motor}$ at coupling element/reaction disk 10 divided by a second lever arm of driver braking force $F_{driver}$ at coupling element/reaction disk 10, and $d_s$ is a deformation of the coupling element/reaction disk 10 effectuated with the aid of driver braking force $F_{driver}$ and/or motor force $F_{motor}$.

If open intermediate gap 18 is present between reaction disk 10 and input element 12, equation (Eq. 2) also applies to reaction disk 10 "as a force balance:"

$$d_s = \frac{\eta}{c} F_{motor}. \tag{Eq. 2}$$

Moreover, equation (Eq. 3) also applies in the case of an open intermediate gap 18 between reaction disk 10 and input element 12 for a kinematic relationship between a support element velocity $v_{motor}$ of support element 14 and an output rod velocity $v_{out}$ of output rod 16:

$$v_{out} = v_{motor} - \eta * d_s'  \tag{Eq. 3}$$

The instantaneous intermediate gap width g results from a starting intermediate gap width $g_0$ of intermediate gap 18 which is open when input element 12 is present in its input element starting position and coupling element 14 is present in its coupling element starting position, deformation $d_s$ of reaction disk 10, and a differential path Δx between an input element path $x_{driver}$ of input element 12 out of its input element starting position and a support element path $x_{motor}$ of support element 14 out of its support element starting position according to equation (Eq. 4) according to:

$$g = (g_0 - \Delta x) - d_s * (1+\eta). \tag{Eq. 4}$$

For the deformation $d_s$ of reaction disk 10, however, it is possible to insert equation (Eq. 2) into equation (Eq. 4), thereby yielding equation (Eq. 5):

$$g = g_0 - \Delta x - F_{motor} * \eta * (1+\eta)/c. \tag{Eq. 5}$$

The instantaneous intermediate gap width g may thus be determined with the aid of motor force $F_{motor}$ of the electric motor according to equation (Eq. 5). Motor force $F_{motor}$ is generally known from the drive controller/drive regulator of the electric motor. In particular, motor force $F_{motor}$ may be reliably determined from a motor current supplied to the electric motor. As an alternative, motor force $F_{motor}$ may also be derived from a system pressure determined with the aid of a system pressure measurement. (If open intermediate gap 18 is present between input element 12 and reaction disk 10, the system pressure results solely from motor force $F_{motor}$ and is independent of driver braking force $F_{driver}$, the system pressure being "reduced" compared to motor force $F_{motor}$ due to prestresses and frictions.)

As an alternative, motor force $F_{motor}$ may also be estimated based on an output rod path $x_{out}$ and a variable $c_{pV}$ using equation (Eq. 6):

$$x_{out} \approx \frac{F_{motor}}{c_{pV}} \tag{Eq. 6}$$

it being possible to read variable $c_{pV}$ as a coefficient of elasticity reflecting a hydraulic stiffness of the braking system from a pV characteristic curve of the braking system.

In this way, an equation (Eq. 7) may be derived based on equations (Eq. 5) and (Eq. 6) using:

$$g = g_0 - \Delta x - c_{pV} * x_{out} * \eta * (1+\eta)/c. \tag{Eq. 7}$$

After the instantaneous intermediate gap width g has been calculated according to equation (Eq. 5) or equation (Eq. 7), it is possible to determine whether intermediate gap 18 is open or closed. If the instantaneous intermediate gap width g calculated according to equation (Eq. 5) or equation (Eq. 7) is greater than zero, it is established that intermediate gap 18 is open. Otherwise, i.e., if the instantaneous intermediate gap width g calculated according to equation (Eq. 5) or equation (Eq. 7) is smaller than or equal to zero, it is established that intermediate gap 18 is closed.

In a further method step of the method described here, at least one actual variable is established with respect to a coupling element path of the coupling element out of its coupling element starting position and/or a coupling element velocity of the coupling element. In the case of an open intermediate gap 18, the at least one actual variable is established with the aid of a first formula. In contrast, in the case of a closed intermediate gap 18, the at least one actual variable is established with the aid of a second formula deviating from the first formula.

Furthermore, the actual variable is established with respect to the coupling element path of the coupling element as output rod path $x_{out}$ of output rod 16:

If intermediate gap 18 is present in an open state, i.e., if the instantaneous intermediate gap width g calculated according to equation (Eq. 5) or equation (Eq. 7) is greater than zero, it is possible to derive equation (Eq. 8) for establishing a change $\delta x_{out}$ of output rod path $x_{out}$ of output rod 16 from equations (Eq. 2) and (Eq. 3) using:

$$\partial x_{out} = \partial x_{motor} - \partial F_{motor} * \eta^2 / c, \tag{Eq. 8}$$

where $\delta x_{motor}$ is a change in support element path $x_{motor}$ of the support element, and $\delta F_{motor}$ is a change in motor force $F_{motor}$.

Optionally, equation (Eq. 9) may also be derived from equation (Eq. 8) with the aid of equation (Eq. 6) using:

$$\partial x_{out} = \partial x_{motor} * \frac{1}{1 + \frac{\eta^2 * c_{pV}}{c}}. \tag{Eq. 9}$$

Both the equation (Eq. 8) and the equation (Eq. 9) may be used as the first equation for establishing the actual variable with respect to the coupling element path of the coupling element as output rod path $x_{out}$ of output rod 16. Both equations (Eq. 8) and (Eq. 9) allow change $\delta x_{out}$ of output rod path $x_{out}$ of output rod 16, or of output rod path $x_{out}$ of output rod 16 to be established based on only one piece of information to be measured. This is a considerable advantage compared to the related art, in which the determination of output rod path $x_{out}$ of output rod 16 out of its output rod starting position requires two kinematic variables, the influence of the potentially open intermediate gap 18 on reaction disk 10 not being ascertainable. This frequently results in a systematic error, which renders the determination of output rod path $x_{out}$ of output rod 16 imprecise/erroneous. In contrast, the coupling element path of the coupling element may be determined considerably more precisely with the aid of the specific embodiment of the method described here.

In the case of closed intermediate gap 18, output rod velocity $v_{out}$ of output rod 16 may be determined as the at least one actual variable with respect to the coupling element velocity of the coupling element. Based on FIG. 1B, a relation between an input element velocity $v_{driver}$ of input element 12 and of output rod velocity $v_{out}$ of output rod 16 according to equation (Eq. 10) is apparent using:

$$v_{driver} = v_{out} - d_s' \qquad (Eq.\ 10)$$

Moreover, equation (Eq. 3) may be rewritten to equation (Eq. 11):

$$v_{motor} = v_{out} + \eta * d_s' \qquad (Eq.\ 11)$$

Equation (Eq. 12) also follows from equations (Eq. 10) and (Eq. 11) using:

$$v_{out} = \frac{v_{motor} + \eta * v_{driver}}{1 + \eta}. \qquad (Eq.\ 12)$$

Equation (Eq. 12) may be used as the second equation for establishing the actual variable with respect to the coupling element velocity of the coupling element as output rod velocity $v_{out}$ of output rod 16. Equation (Eq. 12) is also more advantageous than the related art since it also takes the influence of closed intermediate gap 18 into consideration. For this reason, output rod velocity $v_{out}$ of output rod 16 may also be determined more reliably with the aid of the specific embodiment of the method described here.

When the instantaneous intermediate gap with g of intermediate gap 18 is equal to zero, equation (Eq. 4) is simplified to equation (Eq. 13) using:

$$d_s = (g_0 - \Delta x)/(1+\eta). \qquad (Eq.\ 13)$$

Equation (Eq. 1) may be rewritten to equation (Eq. 14) using:

$$F_{driver} = -c*d_s + F_{motor}*\eta. \qquad (Eq.\ 14)$$

An equation (Eq. 15) may then be derived from equations (Eq. 13) and (Eq. 14) using:

$$F_{driver} = -(g_0 - \Delta x) * \frac{c}{1+\eta} + F_{motor} * \eta. \qquad (Eq.\ 15)$$

In the case of open intermediate gap 18, equation (Eq. 15) may be simplified to equation (Eq. 16) using:

$$0 = -(g_0 - \Delta x) * \frac{c}{1+\eta} + F_{motor} * \eta. \qquad (Eq.\ 16)$$

Multiplied with the reciprocal of the fraction, equation (Eq. 5) again results from equation (Eq. 17).

The actual variables determined with the aid of the aforementioned equations (Eq. 8), (Eq. 9) and (Eq. 12) may be used in a variety of ways. For example, the actual variables determined in this way may be used to (newly) estimate a pV characteristic curve of the braking system, to supervise the hydraulic braking system with respect to a possible circuit failure, or to set the pressure more exactly in the braking system. The method described here thus enables a better pressure setting in the hydraulic braking system, a better blending, and a better supervision of the hydraulic braking system.

Figure 2:
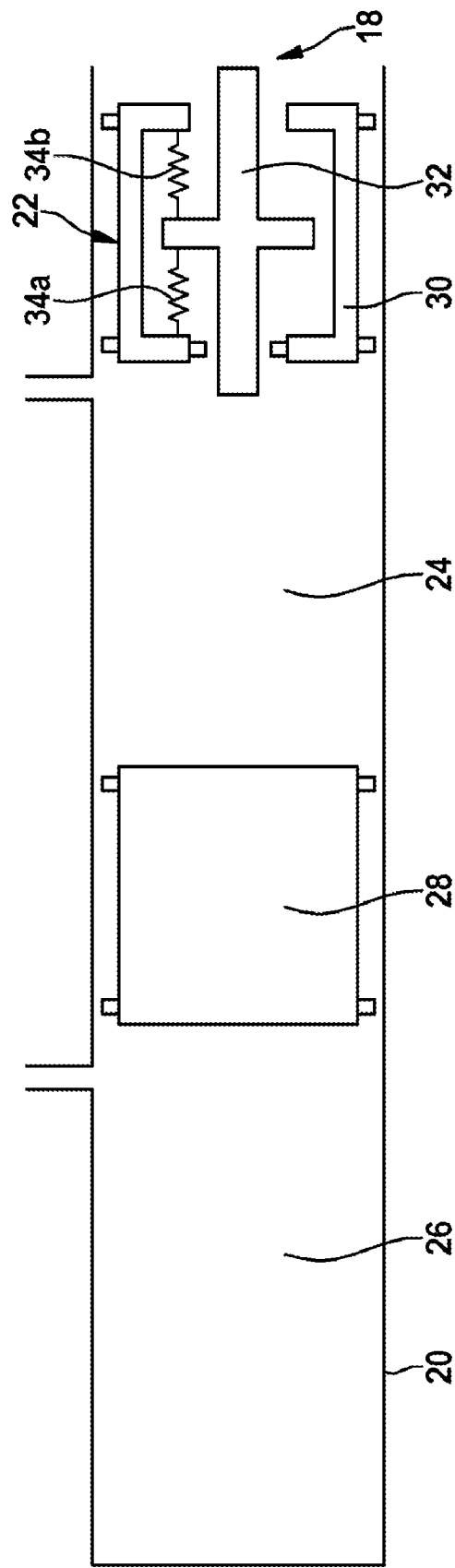
FIG. 2 shows a schematic representation of a second brake booster type for explaining the specific embodiment of the detection method of the present invention.

FIG. 2 shows a schematic representation of a second brake booster type for explaining the specific embodiment of the detection method.

The brake booster schematically shown in FIG. 2 includes a rod piston device 22 which is situated at and/or in a master brake cylinder 20 and delimits a first chamber 24 of master brake cylinder 20. Master brake cylinder 20 is a tandem master brake cylinder, including a floating piston 28 displaceably situated between first chamber 24 and a second chamber 26, only by way of example.

Both a brake actuating element (not sketched) of a vehicle equipped with master brake cylinder 20 and an electric motor (not shown) of the brake booster are directly or indirectly connectable to rod piston device 22 and/or directly or indirectly connected to rod piston device 22. Rod piston device 22 includes a first piston 30, delimiting first chamber 24 including a first partial run-in surface $A_1$, as the support element. Moreover, rod piston device 22 includes, as the coupling element, a second piston 32, delimiting first chamber 24 including a second partial run-in surface $A_2$, and at least one elastic element 34a and 34b supporting first piston 30 and second piston 32 with respect to one another. In addition, the brake booster has an input element (not sketched), an open intermediate gap 18 being present between the input element present in its input element starting position and the coupling element (specifically second piston 32) present in its coupling element starting position. The input element is directly or indirectly connectable/connected to the brake actuating element in such a way that the input element is adjustable/adjusted with the aid of driver braking force $F_{driver}$ (transferred thereto). Accordingly, first piston 30 is directly or indirectly connectable/connected to the electric motor in such a way that first piston 30 is displaceable/displaced with the aid of motor force $F_{motor}$ (transferred thereto).

The above-described detection method may thus also be used (in a slightly modified form) for the brake booster of FIG. 2. A renewed description of the detection method is dispensed with here. An ability to carry out the detection method is neither limited to a specific braking system type nor to a certain vehicle type/motor vehicle type.

Figure 3:
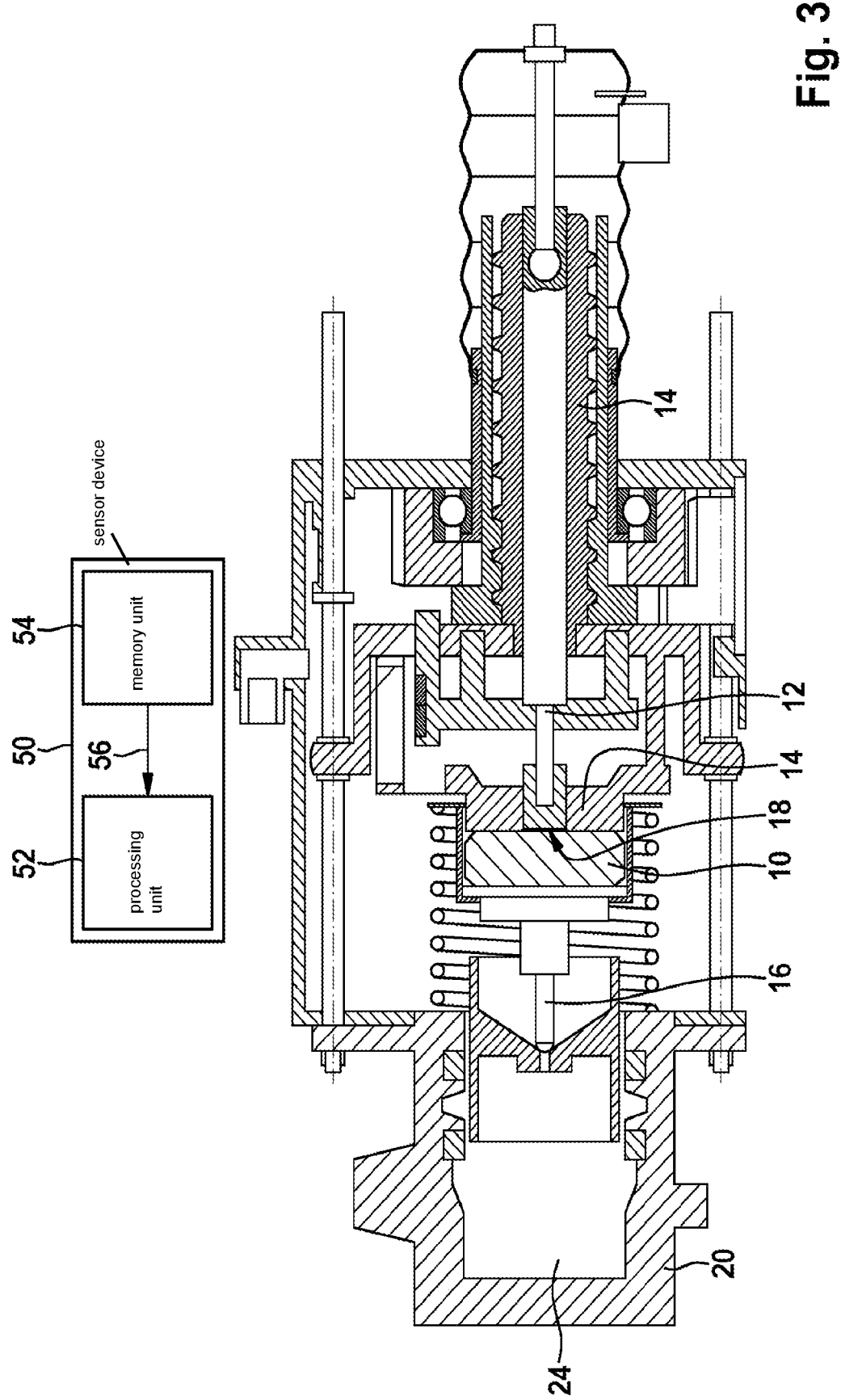
FIG. 3 shows a schematic representation of an electromechanical brake booster equipped with one specific embodiment of the sensor device of the present invention.

FIG. 3 shows a schematic representation of an electromechanical brake booster equipped with one specific embodiment of the sensor device.

Sensor device 50 shown schematically with the aid of FIG. 3 has a processing unit 52 which carries out its function during a transfer of both a driver braking force $F_{driver}$, exerted on a brake actuating element (not shown), to a connected input element 12 of the electromechanical brake booster and a motor force $F_{motor}$ of an electric motor (not sketched) to a connected support element 14 of the electromechanical brake booster. The brake actuating element may, for example, be understood to mean a brake pedal.

A coupling element of the electromechanical brake booster is provided downstream from input element 12 displaced out of its input element starting position with the aid of driver braking force $F_{driver}$ and support element 14 displaced out of its support element starting position with the aid of motor force $F_{motor}$. The coupling element includes a reaction disk 10 and an output rod 16. The coupling element is also at least displaceable out of its coupling element starting position with the aid of motor force $F_{motor}$.

Processing unit 52 is configured to calculate whether an intermediate gap 18, which is at least open when input element 12 is present in its input element starting position and coupling element 14 is present in its coupling element starting position, is closed in such a way that the coupling element is also displaceable with the aid of motor force $F_{motor}$ and with the aid of driver braking force $F_{driver}$. Processing unit 52 may, for example, use the above-described equation (Eq. 5) or (Eq. 7) for this purpose.

Sensor device 50 also includes a memory unit 54 on which at least one first formula and one second formula deviating from the first formula are stored, each for establishing at least one actual variable with respect to a coupling element path of the coupling element out of its coupling element starting position and/or a coupling element velocity of the coupling element. Moreover, processing unit 52 is configured, in the case of open intermediate gap 18, to establish the at least one actual variable with the aid of the first formula provided by memory unit 54 and, in the case of closed intermediate gap, to establish the at least one actual variable with the aid of the second formula provided by memory unit 54. In particular, the equation (Eq. 8) or (Eq. 9) may be stored as the first formula and/or the equation (Eq. 12) may be stored as the second formula on memory unit 54. The first formula or the second formula may each be output with the aid of a formula output signal 56 by memory unit 54 to processing unit 52.

In this way, sensor device 50 also ensures the above-described advantages. Sensor device 50 may, in particular, be designed to carry out the above-described detection method.

An electromechanical brake booster for an on-board hydraulic braking system including sensor device 50 also effectuates the above-described advantages. Furthermore, a hydraulic braking system for a vehicle, including sensor device 50, the electromechanical brake booster cooperating with sensor device 50, a master brake cylinder 20 which is provided upstream from the electromechanical brake booster, and at least one brake circuit (not shown) which is hydraulically connected to master brake cylinder 20 and includes in each case at least one wheel brake cylinder, also creates the above-described advantages. A usability of sensor device 50 is neither limited to a certain brake booster type, nor to a specific braking system type of the hydraulic braking system nor a particular vehicle type/motor vehicle type.

What is claimed is:

1. A detection method for an electromechanical brake booster of an on-board hydraulic braking system, comprising the following steps:
   ascertaining, while both a driver braking force, which is exerted on a brake actuating element, is transferred to a connected input element of the electromechanical brake booster and a motor force of an electric motor is transferred to a connected support element of the electromechanical brake booster in such a way that the input element is displaced out of its input element starting position using the driver braking force and the support element is displaced out of its support element starting position using the motor force, and a coupling element of the electromechanical brake booster which is provided downstream from the input element and the support element is also displaced out of its coupling element starting position at least using the motor force, whether an intermediate gap, which is open when the input element is present in the input element starting position and the coupling element is present in the coupling element starting position, is closed in such a way that the coupling element is also displaced using the motor force and using the driver braking force; and
   establishing at least one actual variable with respect to a coupling element path of the coupling element out of the coupling element starting position and/or a coupling element velocity of the coupling element, wherein in the case of an open intermediate gap the at least one actual variable being established using a first formula, and in the case of a closed intermediate gap the at least one actual variable being established using a second formula deviating from the first formula.

2. The detection method as recited in claim 1, wherein an instantaneous intermediate gap width g of the intermediate gap is established according to:

$$g = g_0 - \Delta x - F_{motor} * \eta * (1+\eta)/c,$$

where $g_0$ is a starting intermediate gap width of the intermediate gap which is open when the input element is present in the input element starting position and the coupling element is present in the coupling element starting position, $\Delta x$ is a differential path between an input element path of the input element out of the input element starting position and a support element path of the support element out of the support element starting position, $F_{motor}$ is the motor force, $\eta$ is a quotient of a first lever arm of the motor force $F_{motor}$ at the coupling element divided by a second lever arm of the driver braking force $F_{driver}$ at the coupling element, and c is a coefficient of elasticity of the coupling element, and, when the instantaneous intermediate gap width g is greater than zero, it being determined that the intermediate gap is open and, when the instantaneous intermediate gap width is smaller than or equal to zero, it being determined that the intermediate gap is closed.

3. The detection method as recited in claim 1, wherein an instantaneous intermediate gap width g of the intermediate gap is established according to:

$$g = g_0 - \Delta x - c_{pV} * x_{out} * \eta * (1+\eta)/c,$$

where $g_0$ is a starting intermediate gap width of the intermediate gap which is open when the input element is present in the input element starting position and the coupling element is present in the coupling element starting position, $\Delta x$ is a differential path between an input element path of the input element out of the input element starting position and a support element path $x_{motor}$ of the support element out of its support element starting position, $c_{pV}$ is a coefficient of elasticity of the hydraulic braking system, $x_{out}$ is the coupling element path of the coupling element out of the coupling element starting position, $\eta$ is a quotient of a first lever arm of the motor force $F_{motor}$ at the coupling element divided by a second lever arm of the driver braking force at the coupling element, and c is a coefficient of elasticity of the coupling element, and, when the instantaneous intermediate gap width g is greater than zero, it being determined that the intermediate gap is open and, when the instantaneous intermediate gap width is smaller than or equal to zero, it being determined that the intermediate gap is closed.

4. The detection method as recited in claim 1, wherein, in the case of determining the intermediate gap is open, a change $\delta x_{out}$ in the coupling element path of the coupling element is established as the at least one actual variable according to $$\partial x_{out} = \partial x_{motor} - \partial F_{motor} * \eta^2 / c$$

as the first formula,
$\delta x_{motor}$ being a change in the support element path of the support element, $\delta F_{motor}$ being a change in the motor force, $\eta$ being a quotient of a first lever arm of the motor force at the coupling element divided by a second lever arm of the driver braking force at the coupling element, and c being a coefficient of elasticity of the coupling element.

5. The detection method as recited in claim 1, wherein, in the case of determining the intermediate gap is open, a change $\delta x_{out}$ in the coupling element path of the coupling element is established as the at least one actual variable according to $$\partial x_{out} = \partial x_{motor} * \frac{1}{1 + \frac{\eta^2 * c_{pV}}{c}}$$

as the first formula, $\delta x_{motor}$ being a change in the support element path of the support element, $\eta$ being a quotient of a first lever arm of the motor force at the coupling element divided by a second lever arm of the driver braking force at the coupling element, $c_{pV}$ being a coefficient of elasticity of the hydraulic braking system, and c being a coefficient of elasticity of the coupling element.

6. The detection method as recited in claim 1, wherein, in the case of determining the intermediate gap is closed, the coupling element velocity $v_{out}$ of the coupling element is established as the at least one actual variable according to $$v_{out} = \frac{v_{motor} + \eta * v_{driver}}{1 + \eta}$$

as the second formula, $v_{motor}$ being a support element velocity of the support element, $v_{driver}$ being an input element velocity of the input element, and $\eta$ being a quotient of a first lever arm of the motor force at the coupling element divided by a second lever arm of the driver braking force at the coupling element.

7. A sensor device for an electromechanical brake booster of an on-board hydraulic braking system, comprising:

a processing unit, which is configured to calculate, while both a driver braking force, which is exerted on a brake actuating element, is transferred to a connected input element of the electromechanical brake booster and a motor force of an electric motor is transferred to a connected support element of the electromechanical brake booster, to calculate, for an input element displaced out of its input element starting position using the driver braking force and the coupling element of the electromechanical brake booster, which is provided downstream from the support element displaced out of its support element starting position with the aid of the motor force and also displaced out of its coupling element starting position at least with the aid of the motor force, whether an open intermediate gap, which is open when the input element is present in the input element starting position and the coupling element is present in the coupling element starting position, is closed in such a way that the coupling element is also displaced using the motor force and using the driver braking force; and a memory unit on which at least one first formula and one second formula deviating from the first formula are stored, each for establishing at least one actual variable with respect to a coupling element path of the coupling element out of its coupling element starting position and/or a coupling element velocity of the coupling element;

wherein the processing unit is configured, in the case of an open intermediate gap, to establish at least one actual variable using the first formula provided by memory unit and, in the case of a closed intermediate gap, to establish the at least one actual variable using the second formula provided by memory unit.

8. An electromechanical brake booster for an on-board hydraulic braking system, comprising:

a sensor device including:

a processing unit, which is configured to calculate, while both a driver braking force, which is exerted on a brake actuating element, is transferred to a connected input element of the electromechanical brake booster and a motor force of an electric motor is transferred to a connected support element of the electromechanical brake booster, to calculate, for an input element displaced out of its input element starting position using the driver braking force and the coupling element of the electromechanical brake booster, which is provided downstream from the support element displaced out of its support element starting position with the aid of the motor force and also displaced out of its coupling element starting position at least with the aid of the motor force, whether an open intermediate gap, which is open when the input element is present in the input element starting position and the coupling element is present in the coupling element starting position, is closed in such a way that the coupling element is also displaced using the motor force and using the driver braking force; and a memory unit on which at least one first formula and one second formula deviating from the first formula are stored, each for establishing at least one actual variable with respect to a coupling element path of the coupling element out of its coupling element starting position and/or a coupling element velocity of the coupling element;

wherein the processing unit is configured, in the case of an open intermediate gap, to establish at least one actual variable using the first formula provided by memory unit and, in the case of a closed intermediate gap, to establish the at least one actual variable using the second formula provided by memory unit.

9. The electromechanical brake booster as recited in claim 8, wherein the coupling element includes a reaction disk.

10. A hydraulic braking system for a vehicle, comprising:

a sensor device including:

a processing unit, which is configured to calculate, while both a driver braking force, which is exerted on a brake actuating element, is transferred to a connected input element of the electromechanical brake booster and a motor force of an electric motor is transferred to a connected support element of the electromechanical brake booster, to calculate, for an input element displaced out of its input element starting position using the driver braking force and the coupling element of the electromechanical brake booster, which is provided downstream from the support element displaced out of its support element starting position with the aid of the motor force and also displaced out of its coupling element starting position at least with the aid of the motor force, whether an open intermediate gap, which is open when the input element is present in the input element starting position and the coupling element is present in the coupling element starting position, is closed in such a way that the coupling element is also displaced using the motor force and using the driver braking force; and a memory unit on which at least one first formula and one second formula deviating from the first formula are stored, each for establishing at least one actual variable with respect to a coupling element path of the coupling element out of its coupling element starting position and/or a coupling element velocity of the coupling element;

wherein the processing unit is configured, in the case of an open intermediate gap, to establish at least one actual variable using the first formula provided by memory unit and, in the case of a closed intermediate gap, to establish the at least one actual variable using the second formula provided by memory unit;

the electromechanical brake booster cooperating with the sensor device;

a master brake cylinder, upstream from which an electromechanical brake booster is provided; and at least one brake circuit which is hydraulically connected to the master brake cylinder and includes in each case at least one wheel brake cylinder.

* * * * *